US010444080B2

(12) United States Patent
Brown et al.

(10) Patent No.: US 10,444,080 B2
(45) Date of Patent: *Oct. 15, 2019

(54) THERMAL MANAGEMENT FOR A WIRELESS COOKING PROBE

(71) Applicant: General Electric Company, Schenectady, NY (US)

(72) Inventors: Justin Tyler Brown, Louisville, KY (US); Christopher Nils Naber, Louisville, KY (US); Deanna Mariel Moya, Miami, FL (US)

(73) Assignee: HAIER US APPLIANCE SOLUTIONS, INC., Wilmington, DE (US)

( * ) Notice: Subject to any disclaimer, the term of this patent is extended or adjusted under 35 U.S.C. 154(b) by 965 days.

This patent is subject to a terminal disclaimer.

(21) Appl. No.: 14/943,115

(22) Filed: Nov. 17, 2015

(65) Prior Publication Data

US 2017/0138797 A1 May 18, 2017

(51) Int. Cl.
  *G01K 1/14* (2006.01)
  *G01K 7/22* (2006.01)
  *A47J 27/00* (2006.01)
  *A47J 36/32* (2006.01)

(52) U.S. Cl.
  CPC .............. *G01K 1/14* (2013.01); *A47J 27/004* (2013.01); *A47J 36/32* (2013.01); *G01K 7/22* (2013.01); *G01K 2207/06* (2013.01)

(58) Field of Classification Search
  CPC ...... G01K 13/00; G01K 1/14; G01K 2207/02; G01K 5/70; G01K 1/12; A47J 27/00; A47J 27/62
  See application file for complete search history.

(56) References Cited

U.S. PATENT DOCUMENTS

| 2,636,240 | A | * | 4/1953 | Pokorny | B01L 9/50 |
| | | | | | 12/146 D |
| 5,083,733 | A | * | 1/1992 | Marino | B44D 3/123 |
| | | | | | 248/110 |
| 5,620,255 | A | | 4/1997 | Cook, III | |
| 8,556,502 | B2 | * | 10/2013 | Austen | G01K 1/026 |
| | | | | | 374/110 |
| D739,280 | S | * | 9/2015 | Petrucelli | D10/52 |
| 9,247,850 | B2 | * | 2/2016 | Alet Vidal | A47J 43/0465 |

(Continued)

FOREIGN PATENT DOCUMENTS

DE 3045143 A1 7/1982
JP 2009093804 A 4/2009

*Primary Examiner* — Gail Kaplan Verbitsky
(74) *Attorney, Agent, or Firm* — Dority & Manning, P.A.

(57) ABSTRACT

A battery-powered temperature probe for measuring the temperature of food products within a cooking utensil. The temperature probe includes a temperature sensor and a control housing positioned at opposite ends of a flexible arm. The flexible arm is magnetically attachable to the cooking utensil such that the temperature sensor is in thermal communication with the food products and the control housing is positioned outside of and below the top of the cooking utensil. A radiant heat shield may be included in the control housing and the control housing may be oriented such that temperature-sensitive components, such as the battery and display, experience reduced temperatures during operation.

15 Claims, 9 Drawing Sheets

(56) References Cited

U.S. PATENT DOCUMENTS

| | | | | |
|---|---|---|---|---|
| 10,088,371 B2* | 10/2018 | Kaiser | .................... | A47J 27/62 |
| 2006/0258916 A1* | 11/2006 | Pietersen | ............. | A61B 5/0002 |
| | | | | 600/301 |
| 2006/0274814 A1* | 12/2006 | Wang | ....................... | G01K 1/14 |
| | | | | 374/208 |
| 2011/0072978 A1* | 3/2011 | Popescu | ................. | A47G 19/14 |
| | | | | 99/288 |
| 2013/0128919 A1* | 5/2013 | Austen | ................... | G01K 1/026 |
| | | | | 374/110 |
| 2013/0305933 A1* | 11/2013 | Heidrich | ................. | A47J 27/62 |
| | | | | 99/331 |
| 2013/0312450 A1* | 11/2013 | Iwasa | .................... | F25D 11/003 |
| | | | | 62/440 |
| 2013/0313292 A1* | 11/2013 | Alley | ..................... | A47G 25/48 |
| | | | | 223/85 |
| 2014/0098835 A1 | 4/2014 | Herzog et al. | | |
| 2015/0114962 A1* | 4/2015 | Kaiser | .................... | A47J 27/62 |
| | | | | 220/212 |
| 2017/0150841 A1* | 6/2017 | Johncock | ................. | A47J 27/62 |
| 2018/0143086 A1* | 5/2018 | Stoufer | ................... | A47J 36/32 |
| 2018/0352926 A1* | 12/2018 | Batres | .................... | A45C 11/24 |

\* cited by examiner

THERMAL MANAGEMENT FOR A WIRELESS COOKING PROBE

FIELD OF THE INVENTION

The present disclosure relates generally to a temperature probe for a cooking appliance, or more specifically, to a temperature probe capable of withstanding very high cooking temperatures when attached to a cooking utensil.

BACKGROUND OF THE INVENTION

Cooktops generally have one or more heating elements configured for heating a cooking utensil. The cooking utensil, e.g., a pot or a pan, may be placed on the cooktop and food products (including, e.g., food solids, liquid, or water) may be placed inside the cooking utensil for cooking. A controller may selectively energize the heating element(s) to provide thermal energy to the cooking utensil and the food products placed therein. Alternatively, certain cooktops, often referred to as induction cooktops, provide energy in the form of an alternating magnetic field which causes the cooking utensil to generate heat. In both types of cooktops, a controller selectively energizes either the heating element(s) or a magnetic coil to heat the food products until they are properly cooked.

Many food products require careful monitoring and control of the cook time and temperature in order to provide optimal cooking results. In order to obtain precise feedback and control of the temperature of the food products as they are heated/cooked, a temperature probe may be placed in thermal communication with the food products. Temperature information is communicated to a control housing, which typically includes control electronics and a display for displaying the temperature of the food products.

Temperature probes are typically battery-powered in order to improve mobility and simplify operation. Notably, the control electronics and battery have thermal operating limits that should not be exceeded to ensure safe, proper operation and extended lifetime of the temperature probe. To protect the battery and control electronics, and to improve visibility of the temperature display, the control housing is typically placed outside of the cooking utensil. However, conventional temperature probes are typically exposed to temperatures that are too high for safe operation, especially when used with high-temperature cooking, such as frying foods at 375° F. or higher, which can damage the battery, display, or other electronic components. In addition, the temperature displays are often not optimally placed for user comfort and convenience.

Accordingly, a temperature probe capable of withstanding very high cooking temperatures while maintaining safe and proper operation is desirable. More particularly, a temperature probe that contains a control housing that minimizes the temperatures experienced by the control electronics and battery while providing improved visibility of the temperature display would be especially beneficial.

BRIEF DESCRIPTION OF THE INVENTION

Additional aspects and advantages of the invention will be set forth in part in the following description, may be apparent from the description, or may be learned through practice of the invention.

In general, the present subject matter provides a battery-powered temperature probe for measuring the temperature of food products within a cooking utensil. The temperature probe includes a temperature sensor and a control housing positioned at opposite ends of a flexible arm. The flexible arm is magnetically attachable to the cooking utensil such that the temperature sensor is in thermal communication with the food products and the control housing is positioned outside of and below the top of the cooking utensil. A radiant heat shield may be included in the control housing and the control housing may be oriented such that temperature-sensitive components, such as the battery and display, experience reduced temperatures during operation. In this manner, safe and proper operation of the control electronics and battery may be achieved, the visibility of the display may be improved, and overall temperature probe performance may be optimized.

In one exemplary embodiment, a temperature probe for measuring the temperature of food products within a cooking utensil is provided. The temperature probe includes a flexible arm having a first end including a first magnet and a second end including a second magnet. The flexible arm is removably attachable to the cooking utensil by positioning the first end proximate an interior side of the cooking utensil such that it is secured by magnetic force and positioning the second end proximate an exterior side of the cooking utensil such that it is secured by magnetic force. A temperature sensor extends from the first end of the flexible arm and is configured for measuring the temperature of the food products in the cooking utensil. A control housing extends from the second end of the flexible arm and includes a controller operatively connected with the temperature sensor. The second end of the flexible arm defines a support surface configured for contacting the exterior side of the cooking utensil and extending the control housing away from the cooking utensil.

In another exemplary embodiment, a cooking appliance having closed loop temperature control of food products in a cooking utensil is provided. The cooking appliance includes a cooktop including a heating element; a temperature probe including a temperature sensor configured for measuring the temperature of the food products in the cooking utensil and a wireless transmitter for wirelessly communicating a measured temperature of the food products; and a cooktop control unit including a communication module configured to receive the measured temperature from the wireless transmitter and selectively energize the heating element to maintain a desired temperature of the food products responsive to the measured temperature from the temperature probe. The temperature probe includes a controller body defining a mounting base and a control housing, the mounting base including a mounting magnet and being magnetically attachable to an exterior side of the cooking utensil, and the control housing extending from the mounting base to define an air gap between the exterior side of the cooking utensil and the control housing.

In still another exemplary embodiment, a temperature probe for measuring the temperature of food products within a cooking utensil is provided. The temperature probe includes a thermistor configured for placement in thermal communication with the food products and a controller body defining a mounting base and a control housing. The mounting base includes a mounting magnet and defines a support surface. The mounting magnet is magnetically attachable to an outer wall of the cooking utensil such that the support surface sits flush against the outer wall and extends the control housing away from the cooking utensil. The control housing includes a battery, a display, and a control board in operative communication with the thermistor.

According to another exemplary embodiment, a temperature probe for measuring the temperature of food products within a cooking utensil is provided. The temperature probe includes a flexible arm having a first end including a first magnet and a second end including a second magnet. The flexible arm is removably attachable to the cooking utensil by positioning the first end proximate an interior side of the cooking utensil such that it is secured by magnetic force and positioning the second end proximate an exterior side of the cooking utensil such that it is secured by magnetic force. A temperature sensor extends from the first end of the flexible arm and is configured for measuring the temperature of the food products in the cooking utensil. A control housing extends from the second end of the flexible arm and includes a battery, a display, and a control board having control electronics operatively connected with the temperature sensor, the control board being positioned between the cooking utensil and the battery.

According to another exemplary embodiment, a cooking appliance having closed loop temperature control of food products in a cooking utensil is provided. The cooking appliance includes a cooktop including a heating element; a temperature probe including a temperature sensor configured for measuring the temperature of the food products in the cooking utensil and a wireless transmitter for wirelessly communicating a measured temperature of the food products; and a cooktop control unit including a communication module configured to receive the measured temperature from the wireless transmitter and selectively energize the heating element to maintain a desired temperature of the food products responsive to the measured temperature from the temperature probe. The temperature probe includes a controller body having a battery, a display, a controller, and a radiant heat shield, the radiant heat shield being positioned between the battery and the cooking utensil.

According to still another exemplary embodiment, a temperature probe for measuring the temperature of food products within a cooking utensil is provided. The temperature probe includes a thermistor configured for placement in thermal communication with the food products and a controller body. The controller body defines a mounting base and a control housing. The mounting base includes a mounting magnet and defines a support surface, the mounting magnet being configured to secure the controller body to an outer wall of the cooking utensil such that the support surface sits flush against the outer wall and extends the control housing away from the cooking utensil. The control housing includes a battery, a display, and a control board in operative communication with the thermistor, the control board being positioned between the cooking utensil and the battery.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
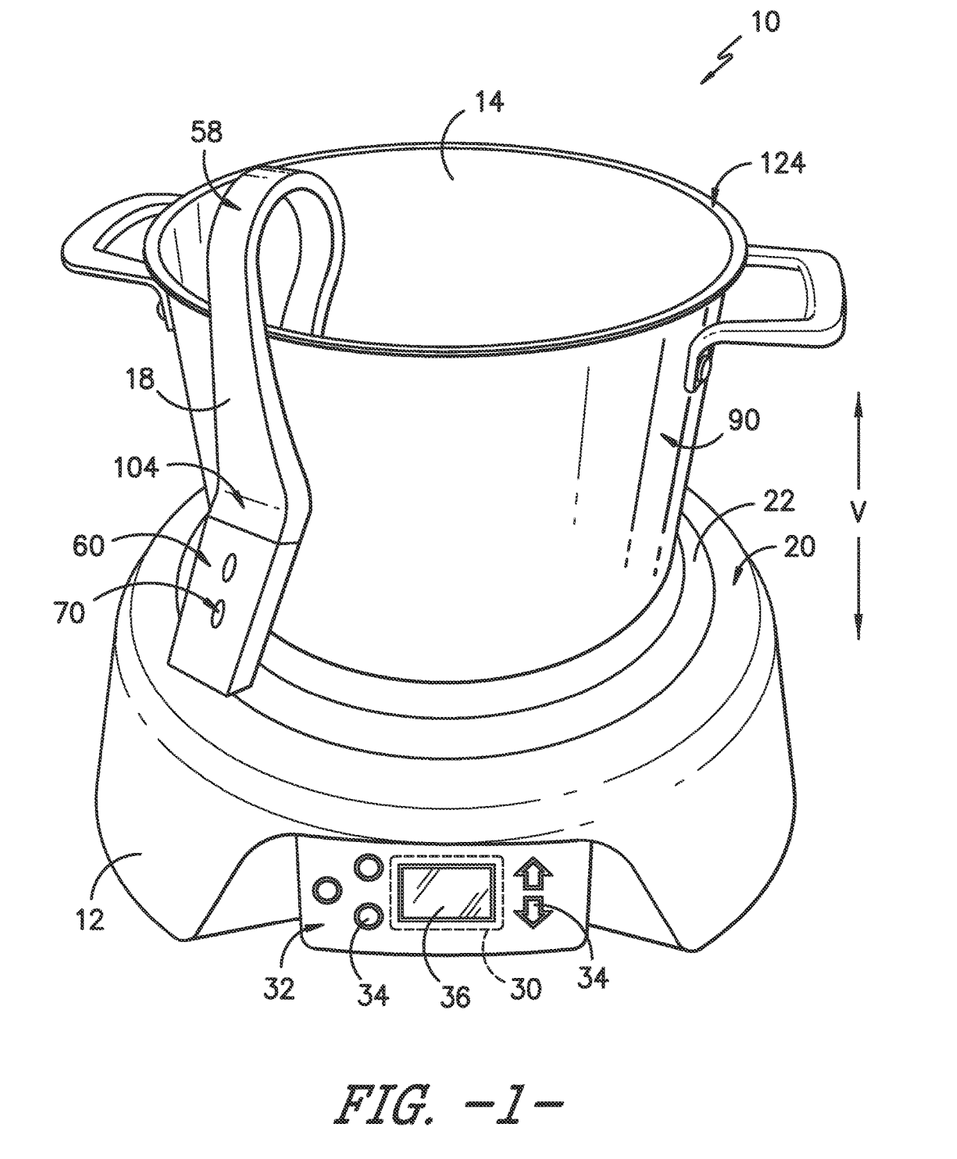
FIG. 1 provides a front perspective view of a cooking appliance including a cooktop, a cooking utensil, and a temperature probe attached to the cooking utensil according to an exemplary embodiment of the present subject matter.

FIG. 1 provides a perspective view of an exemplary cooking appliance 10 that may be configured in accordance with aspects of the present subject matter. For the particular embodiment of FIG. 1, cooking appliance 10 may define a vertical direction V and a perpendicular lateral direction L (best shown in FIG. 3). As described in detail below, cooking appliance 10 generally includes a cooktop 12, a cooking utensil 14 containing food products 16, and a temperature probe 18. However, as will be understood by those skilled in the art, cooking appliance 10 is provided by way of example only, and aspects of the present subject matter may be used with any other suitable cooking appliance. Thus, the present subject matter may be used with other cooking appliances having different cooktop and heating element configurations, and may also be used with different types of cooking utensils. For example, cooktop 12 may be part of a conventional stove or oven appliance.

As described herein, cooking appliance 10 may heat cooking utensil 14 using thermal conduction, e.g., using a flame from a gas cooktop or using electrical resistance heating elements. In this regard, cooktop 12 will be described generally herein as having a cooktop surface 20 and a heating element 22. However, one skilled in the art will appreciate that this configuration is described only for the purpose of explanation. Other types and configurations of cooktops having different numbers and types of heating elements are contemplated as within the scope of the invention.

For example, according to another exemplary embodiment, cooktop 12 may be an induction cooktop. Induction cooktops typically heat a cooking utensil by energizing an induction coil located under the cooktop surface. The energized induction coil generates a magnetic field that induces current flow in the cooking utensil, thereby heating the cooking utensil. In this regard, induction cooking utensils are typically made of a conductive ferromagnetic material which generates heat when placed in the magnetic field. The cooking utensil then transfers the generated heat energy to the food products contained therein. One skilled in the art will appreciate that aspects of the present invention may be used with either of the above described methods of heating a cooking utensil, among others.

Cooktop 12 is further equipped with a cooktop control unit 30 to regulate operation of cooking appliance 10 (and various components thereof). For example, cooktop control unit 30 may regulate the operation of heating element 22, as well as the operation of temperature probe 18. Cooktop control unit 30 may be in communication (via, for example, a suitable wired or wireless connection) with heating element 22 and other suitable components of cooking appliance 10, as discussed herein. Cooktop control unit 30 may configure cooking appliance 10 for cooking food products 16 at a selected temperature or according to a selected temperature profile, and may also rely on temperature feedback from temperature probe 18, as discussed herein. As used herein, "food products" may refer to any solid or liquid product to be eaten or liquid in which food product is cooked or boiled, e.g., water.

By way of example, cooktop control unit 30 may include one or more memory devices and one or more microprocessors, such as general or special purpose microprocessors operable to execute programming instructions or microcontrol code associated with a cooking cycle. The memory may represent random access memory such as DRAM, or read only memory such as ROM or FLASH. In one embodiment, the processor executes programming instructions stored in memory. The memory may be a separate component from the processor or may be included onboard within the processor.

Cooktop control unit 30 may be positioned in a variety of locations throughout cooking appliance 10. In the illustrated embodiment, cooktop control unit 30 may be located within a user interface panel 32 of cooktop 12 as shown in FIG. 1. In such an embodiment, input/output ("I/O") signals may be routed between cooktop control unit 30 and various operational components of cooking appliance 10 along wiring that may be routed through cooktop 12. Typically, cooktop control unit 30 is in communication with user interface panel 32 and controls 34 through which a user may select various operational features and modes and monitor progress of cooking appliance 10. In one embodiment, user interface 32 may represent a general purpose I/O ("GPIO") device or functional block. In one embodiment, controls 34 may be one or more of a variety of electrical, mechanical or electromechanical input devices including rotary dials, push buttons, and touch pads. User interface 32 may include a display component, such as a digital or analog display device 36 designed to provide operational feedback to a user.

User interface 32 may be in communication with cooktop control unit 30 via one or more signal lines or shared communication busses. Cooktop control unit 30 may also include a wireless receiver and may be communication with one or more sensors, e.g., temperature probe 18 that is used to measure temperature inside food products 16 in cooking utensil 14 and provide such measurements to cooktop control unit 30. In this manner, cooktop control unit 30 may receive temperature measurements from temperature probe 18, provide a temperature indication to the user with cooktop display 36, and adjust heating element 22 in response to the temperature measurements and user manipulation of user interface panel 32.

It should be appreciated that temperature probe 18 according to the present subject matter is not limited to use with any particular style, model, or configuration of cooking appliance 10. The exemplary embodiment depicted in FIG. 1 is for illustrative purposes only. For example, different locations may be provided for user interface 32, different types and configurations of heating elements 22 may be used, and other differences may be applied as well.

According to an exemplary embodiment of the present invention, cooking appliance 10 may have closed loop temperature control of food products 16 in a cooking utensil 14. This closed loop control may be achieved, for example, by attaching temperature probe 18 to cooking utensil 14. Temperature probe 18 may provide instant feedback regarding the actual temperature of food products 16 as they are cooked. Cooking appliance 10 may then make adjustments to control the temperature of food products 16 responsive to temperature probe 18 measurements and according to a predetermined temperature or temperature profile.

Figure 3:
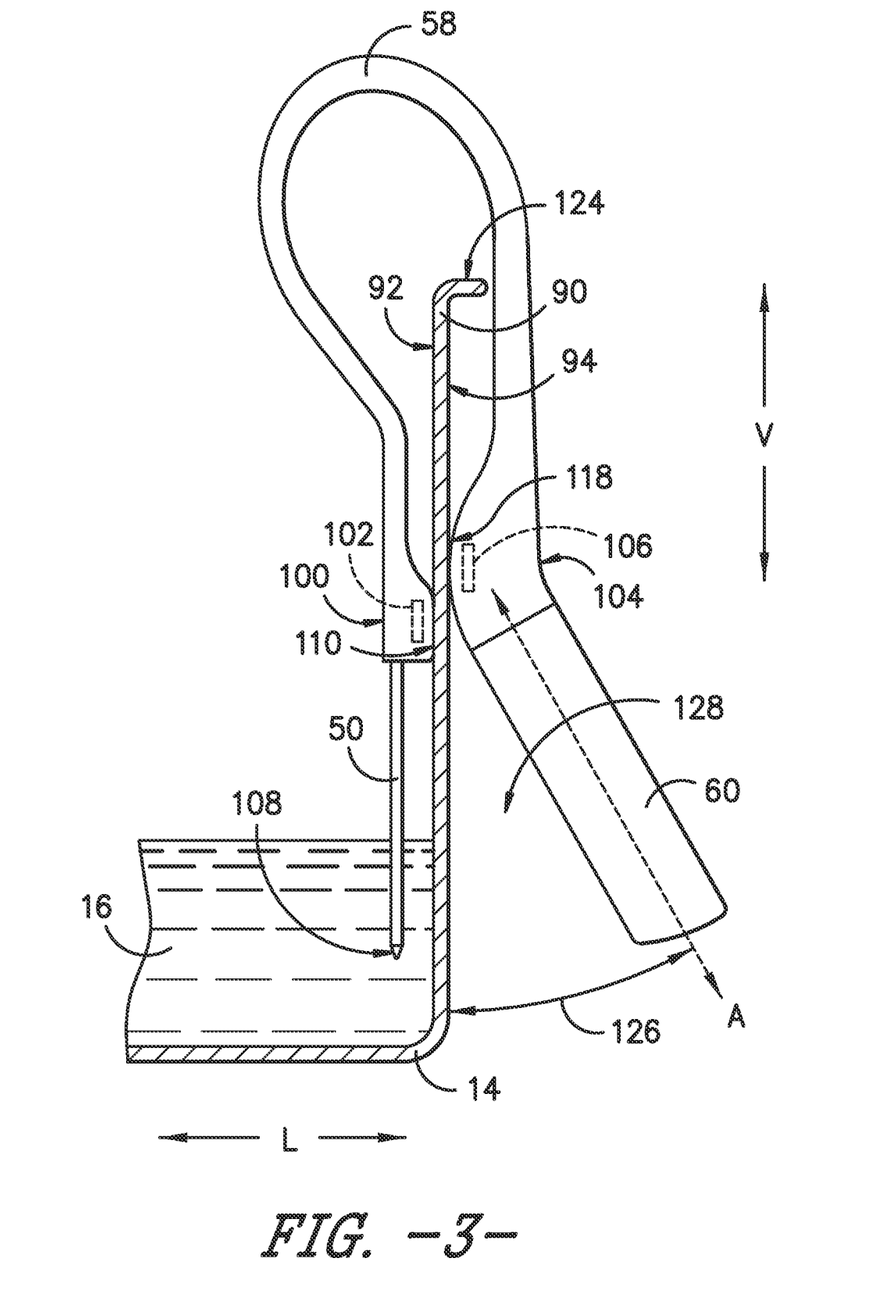
FIG. 3 provides a side view of the exemplary temperature probe attached to the cooking utensil, which is shown in phantom for clarity.
Figure 4:
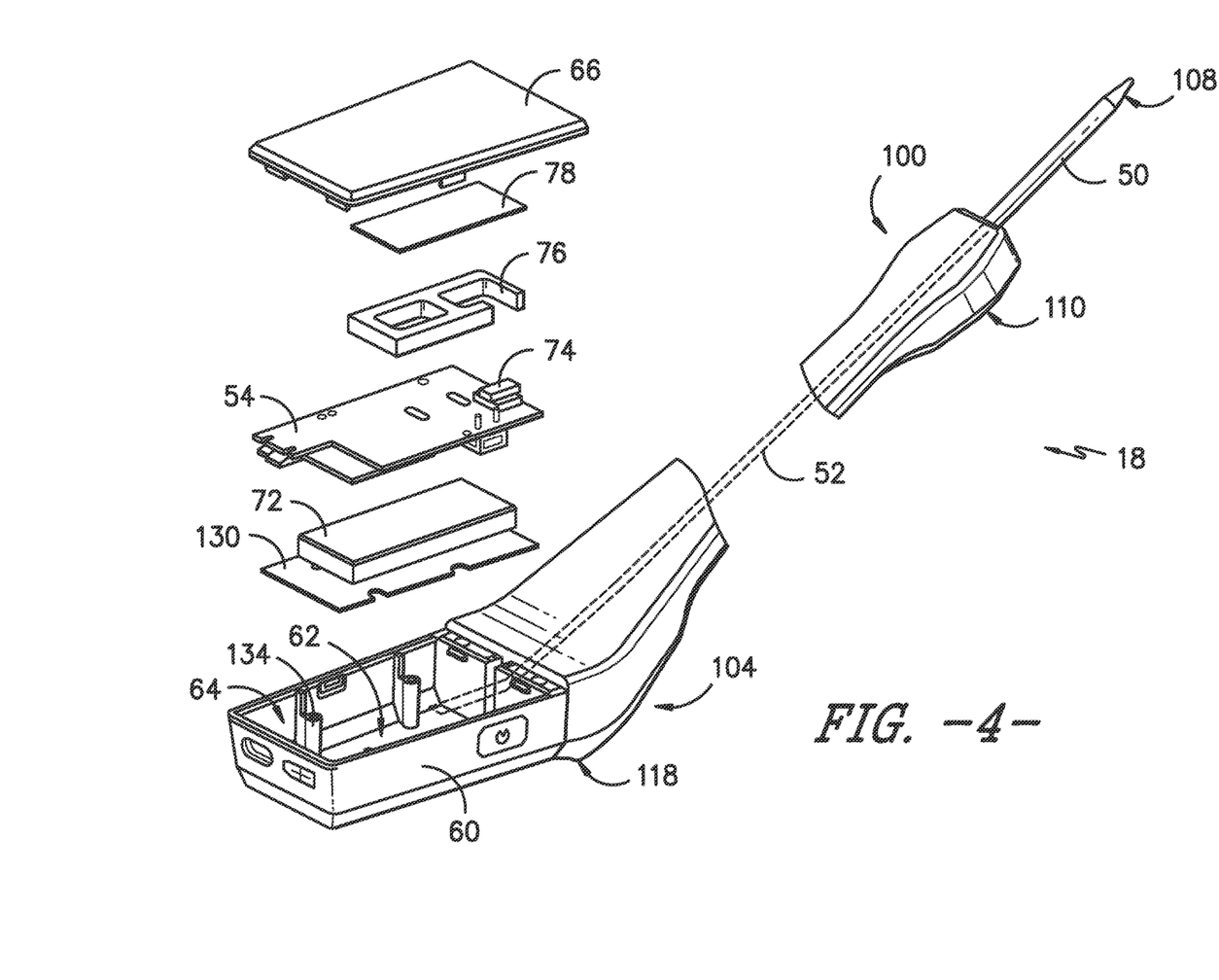
FIG. 4 is an exploded perspective view of the exemplary temperature probe of FIG. 1.

According to an exemplary embodiment illustrated in FIG. 3, temperature probe 18 generally includes a temperature sensor 50 that may be placed in thermal contact with food products 16 in cooking utensil 14 in order to measure the temperature of food products 16. Temperature sensor 50 may have a signal wire 52 connecting it to a control board 54 and temperature probe controller 56. As shown in the illustrated embodiment of FIG. 4, signal wire 52 may pass through the middle of a flexible arm 58 to a control housing 60, where it may be routed to control board 54. According to an alternative embodiment, temperature sensor 50 may be in wireless communication with control board 54 through any suitable wireless communication protocol. Temperature sensor 50 may be a thermocouple, a thermistor, or any other device suitable for measuring the temperature of food products 16 within cooking utensil 14.

As shown in FIGS. 1 through 5, control housing 60 may define an enclosure for housing a variety of components and control electronics for operating temperature probe 18. According to the illustrated embodiment, control housing 60 is substantially rectangular in cross section and has a bottom surface 62 and side surfaces 64. A cover 66 may close and seal control housing 60 and serve as the top surface of control housing 60. According to the illustrated embodiment, cover 66 may be transparent or semi-transparent so that a temperature display 70 may be visible from outside of control housing 60. Although described above as a rectangular box, one skilled in the art will appreciate that control housing 60 may be any enclosure of sufficient size and shape to house various electronic components of temperature probe 18.

Control housing 60 may include control board 54, e.g., a printed circuit board, having controller 56 positioned thereon and being operatively connected to temperature sensor 50. Controller 56 may therefore be disposed in control housing 60 and may be configured to control the operation of temperature probe 18. Controller 56 may be similar to cooktop control unit 30 in many respects. For example, controller 56 may include one or more processor(s) and associated memory device(s) configured to perform a variety of computer-implemented functions (e.g., operating cooking appliance 10 and performing the methods, steps, and the like disclosed herein). Controller 56 may be operatively connected to temperature sensor 50 via signal wire 52 (or wirelessly), and may be configured to receive temperature data from temperature sensor 50. As discussed below, temperature probe 18 may transmit this temperature data to cooktop control unit 30 and may also display the temperature, or other relevant information, on display 70 (described below).

According to the illustrated embodiment, control housing 60 may also include a power source for operating temperature probe 18. For example, according to the illustrated embodiment, temperature probe 18 is battery-powered and may include a rechargeable lithium-ion battery 72. However, one skilled in the art will appreciate that battery 72 is only one exemplary power source and others may be used as well. For example, other types of batteries may be used, or even other types of energy storage components, such as capacitors or fuel cells. Alternatively, temperature probe 18 may be tethered to cooktop 12 and may receive power directly from cooktop control unit 30.

According to the illustrated embodiment, display 70 includes a light source 74, a light guide 76, and a diffuser film 78, which are stacked together and positioned directly under top cover 66. Controller 56 may control display 70 to present useful information to the user, e.g., the temperature of the food products 16. Light source 74 provides light which is transported throughout light guide 76 with minimal loss. Finally, light diffuser 78 is an optical component used to evenly distribute light from light source 74 and light guide 76, thereby eliminating bright spots and creating a clearer image for the user. One skilled in the art will appreciate that the above-described display 70 is only used for the purpose of explanation. Other types and configurations of displays are possible and within the scope of the invention.

A wireless communication module 80 (see FIGS. 5 and 7) may also be included to communicate temperature information as described in more detail below. More specifically, controller 56 may be in operative communication with wireless communication module 80 to facilitate communications between controller 56 and various other components of cooking appliance 10, such as cooktop control unit 30, as discussed herein. For instance, wireless communications module 80 may serve as an interface to permit controller 56 to transmit and/or receive signals associated with the temperature of cooking food products 16, as discussed herein. Communications between temperature probe controller 56 and the cooktop control unit 30 may be achieved using any suitable wireless communication protocol, for example, WiFi, ZigBee, Bluetooth, and others.

During operation, cooktop control unit 30 may receive the measured temperature data from wireless communications module 80 and selectively energize heating element 22 to maintain a desired temperature of food products 16 responsive to the measured temperature from temperature probe 18. In this manner, cooktop control unit 30 may receive instantaneous feedback regarding the actual temperature of food products 16 within cooking utensil 14, resulting in closed loop feedback that may optimize control of heating element 22. Controller 56 may then adjust heating element 22 to ensure the temperature is precisely controlled to match the desired cooking temperature or a specific cooking temperature profile.

To mount temperature probe 18 on cooking utensil 14, flexible arm 58 may be placed over a side 90 of cooking utensil 14, and temperature sensor 50 and control housing 60 may be secured to an interior surface 92 and an exterior surface 94 of side 90 of cooking utensil 14, respectively. Flexible arm 58 must be able to withstand very high temperatures. According to the illustrated embodiment, flexible arm 58 is made of silicone rubber. Silicone rubber is capable of withstanding very high temperatures while remaining flexible. In addition, silicone rubber is also non-toxic, is not prone to cracking or deteriorating, and acts as an insulator to limit the conduction of heat to control housing 60. However, one skilled in the art will appreciate that flexible arm 58 may be made from any suitably flexible and durable material that can withstand high temperatures.

Figure 2:
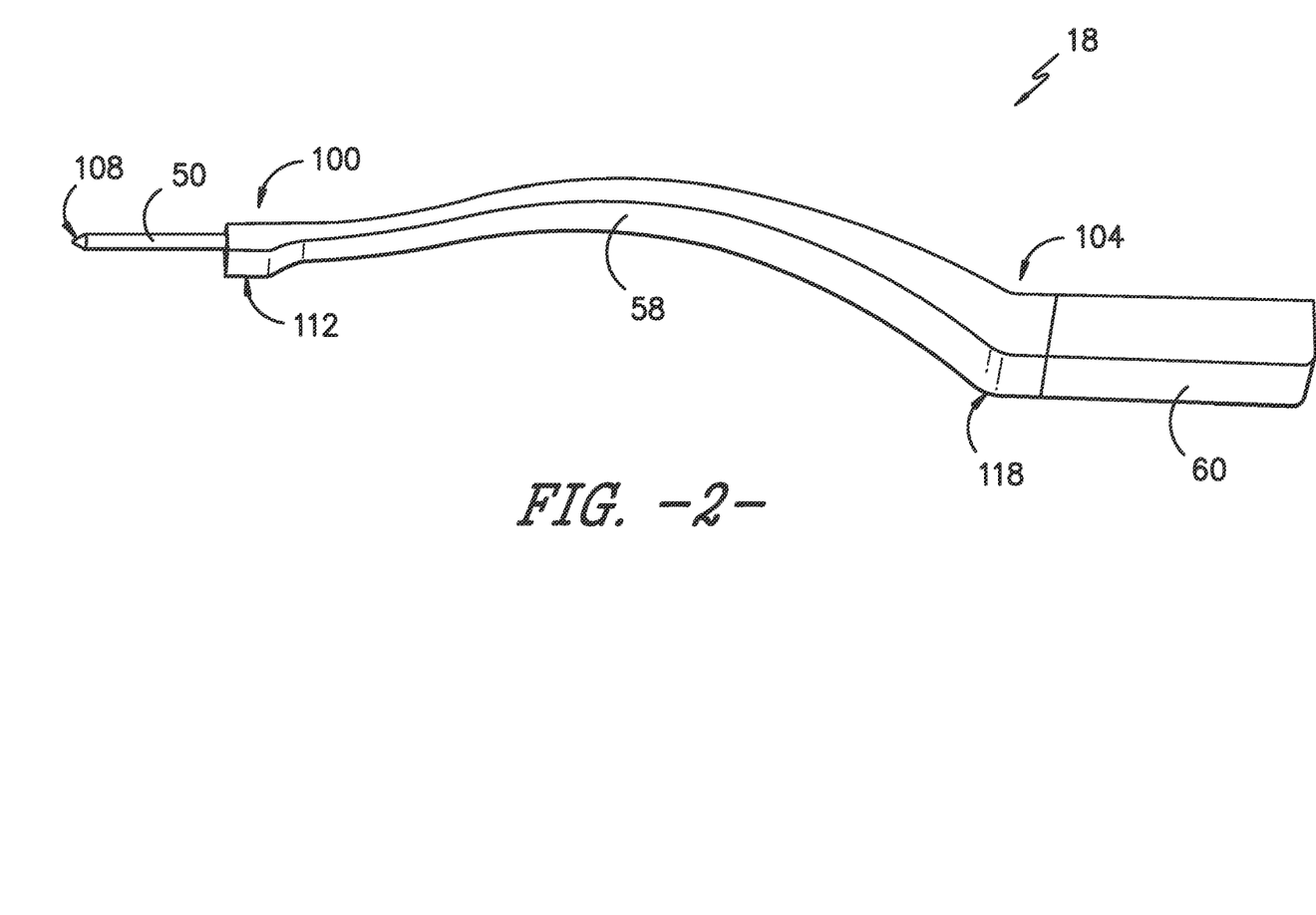
FIG. 2 provides a perspective view of the exemplary temperature probe of FIG. 1.

According to an exemplary embodiment, flexible arm 58 may be attached to cooking utensil 14 using magnets. For example, as shown in FIG. 2, flexible arm 58 may have a first end 100 including a first magnet 102 and a second end 104 including a second magnet 106. In other words, first magnet 102 may be proximate temperature sensor 50 and distal from control housing 60, and second magnet 106 may be proximate control housing 60 and distal from temperature sensor 50. Magnets 102, 106 may be attached to flexible arm 58 after it is molded, for example, by using an adhesive or mechanical fastener. Alternatively, magnets 102, 106 may be incorporated into a mold prior to molding flexible arm 58, such that they may be integrally molded within flexible arm 58. In addition, magnets 102, 106 may be positioned and oriented within flexible arm 58 such that the magnetic poles attract each other when flexible arm 58 is placed over side 90 of cooking utensil 14.

Flexible arm 58 may be attached to cooking utensil 14 by placing first end 100 and second end 104 at the desired position on cooking utensil 14. For example, as shown in FIG. 3, first end 100 is placed on interior surface 92 such that it is secured by magnetic force to cooking utensil 14, which is typically ferromagnetic. In this manner, first end 100 of flexible arm 58 is magnetically attachable to cooking utensil 14 such that temperature sensor 50 may be selectively positioned and fixed within food products 16—e.g., at a height where a tip 108 of temperature sensor 50 is positioned at a desirable depth within food products 16 for precise temperature monitoring. Similarly, second end 104 may be placed on exterior surface 94 of cooking utensil 14 such that it is secured by magnetic force. In this manner, second end 104 may be positioned outside cooking utensil 14 at a position that provides an optimal viewing angle of display 70 and/or results in the best reduction in control housing 60 temperatures.

In cases where cooking utensil 14 is not ferromagnetic, flexible arm 58 may still be secured to cooking utensil 14 by positioning first end 100 and second end 104 of flexible arm 58 near interior surface 92 and exterior surface 94, respectively, such that the magnetic force between first magnet 102 and second magnet 106 draw first end 100 and second end 104 toward each other and generate a clamping force on side 90 of cooking utensil 14. In this regard, first magnet 102 and second magnet 106 should be positioned within first end 100 and second end 104, respectively, such that their opposing polarities generate an attractive force when placed on either side of the cooking utensil 14 (i.e., the orientation shown in FIG. 3).

According to alternative embodiments, magnets 102, 106 need not be used to secure temperature probe 18 to cooking utensil 14. For example, adhesives may be used to stick the ends 100, 104 of temperature probe 18 to cooking utensil 14, a physical support may be used to support temperature sensor 50 on the bottom of cooking utensil 14, or a clamping mechanism may be used to secure temperature probe 18 to side 90 of cooking utensil 14. Indeed, one skilled in the art will appreciate that any method of securing temperature sensor 50 inside cooking utensil 14 is contemplated as within the scope of the present subject matter.

Temperature sensor 50 extends from first end 100 of flexible arm 58 and may be configured for measuring the temperature of food products 16 in cooking utensil 14. In this regard, tip 108 of temperature sensor 50 may be placed in food products 16 as desired to determine the temperature of food products 16. First end 100 may define a protruding sensor support surface 110 that keeps temperature sensor 50 away from side 90 of cooking utensil 14. In addition, according to some exemplary embodiments, temperature sensor 50 may extend from first end 100 such that it forms and angle relative to vertical direction V when attached to side 90 of cooking utensil 14. For example, according to an exemplary embodiment, temperature sensor 50 may extend at an angle that is between 0 and 45 degrees.

As best shown in FIGS. 1 through 3, control housing 60 may extend from second end 104 of flexible arm 58. Notably, control housing 60 may therefore be mounted directly to cooking utensil 14, such that it is exposed to very high operating temperatures. As described above, control housing 60 generally defines an enclosure for housing sensitive electronic components and a power source for temperature probe 18. Many of these components may exhibit improved performance and lifetime if maintained below these very high operating temperatures. Therefore, aspects of the present invention are directed to temperature probe 18 constructions that minimize the heat experienced by the components in control housing 60.

According to the illustrated embodiment, second end 104 of flexible arm 58 is configured to extend control housing 60 of temperature probe 18 away from exterior surface 94 of cooking utensil 14. For example, second end 104 may define a control housing support surface 118 configured for contacting exterior surface 94 of cooking utensil 14 when second magnet 106 secures second end 104 to cooking utensil 14. Support surface 118 may be constructed from the same material as flexible arm 58, e.g., silicone rubber, and may be a flat pad or may be curved to match the profile of side 90 of cooking utensil 14.

Figure 9:
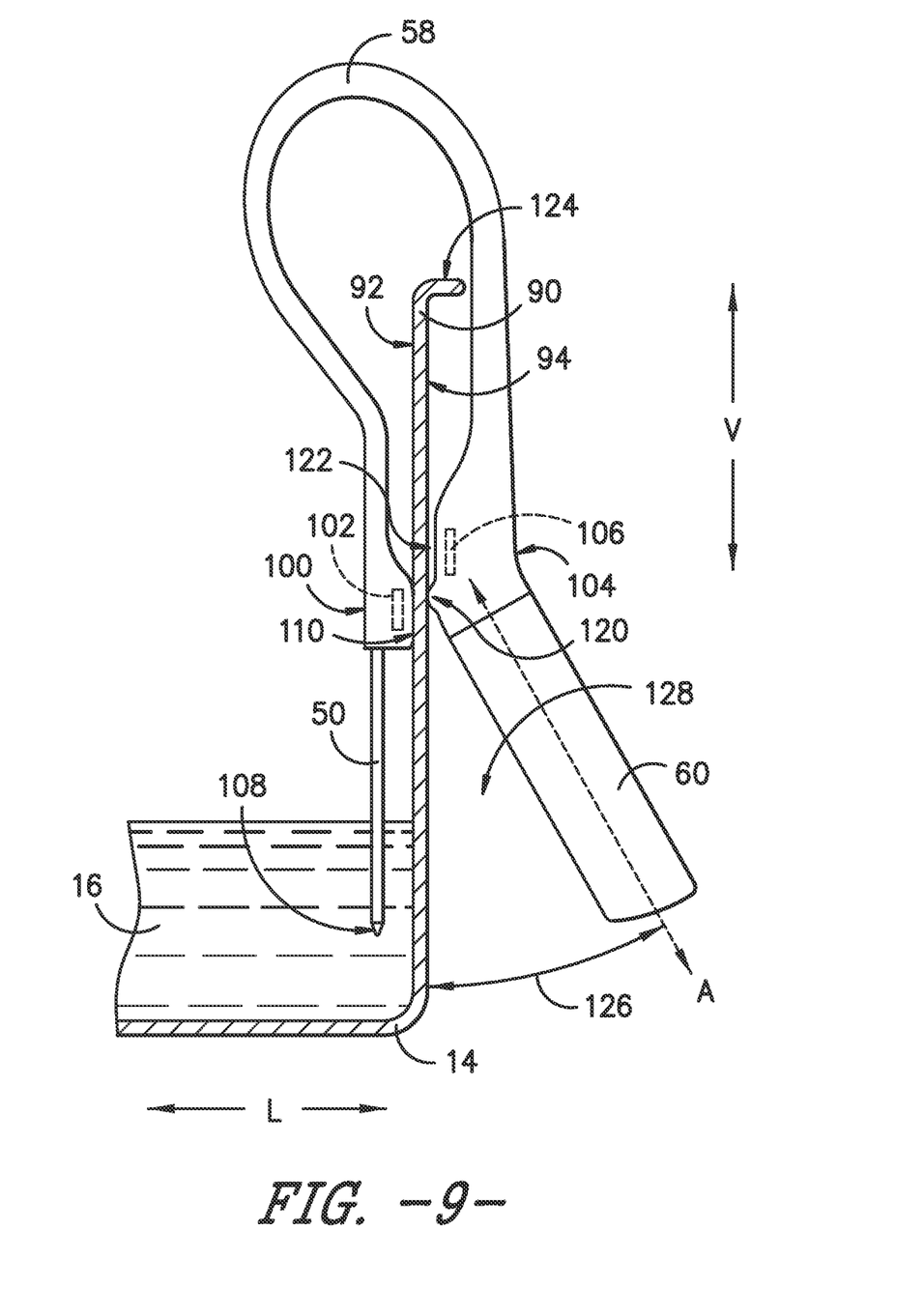
FIG. 9 provides a side view of an exemplary temperature probe attached to the cooking utensil, which is shown in phantom for clarity.

According to some exemplary embodiments illustrated in FIG. 9, support surface 118 may define two or more support feet 120 that contact exterior surface 94 of cooking utensil 14. Support feet 120 may support control housing 60 away from side 90 of cooking utensil 14 and provide a gap 122 between cooking utensil 14 and second end 104 to allow air to circulate. Gap 122 breaks a portion of the thermal contact between control housing 60 and cooking utensil 14 and reduces the overall heat flow from cooking utensil 14 to components disposed within control housing 60—e.g., battery 72.

Support feet 120 may vary in size and may be placed on control housing support surface 118 to achieve the desired mounting position. For example, according to the illustrated embodiment, support feet 120 may be placed below second magnet 106 to support control housing 60 at an angled position. According to an exemplary embodiment, support feet 120 are made from the same material as flexible arm 58, e.g., silicone rubber. However, one skilled in the art will appreciate that support feet 120 may alternatively be any insulating pad that is attached to support surface 118 and provides a gap between cooking utensil 14 and support surface 118. In addition, similar support feet may be used on first end 100 of flexible arm 58 if desired.

Although the exemplary embodiments described above refer to control housing 60 extending from second end 104 of flexible arm 58, one skilled in the art will appreciate that this is only one possible configuration and other configurations are possible. For example, according to another exemplary embodiment, control housing 60 may include a mounting base having the same profile as second end 104 of flexible arm 58, such that control housing 60 may be directly attached to cooking utensil in the same manner as second end 104 of flexible arm 58. According to this embodiment, flexible arm 58 may attach directly to mounting base or control housing 60, but is not used to support control housing 60 in its extended position. Other configurations are also possible and within the scope of the present subject matter.

Whether due to support surface 118 of flexible arm 58 or mounting base of control housing 60, control housing 60 extends away from cooking utensil 14. As described above, control board 54, battery 72, and wireless communication module 80 are preferably disposed within control housing 60 such that they experience decreased operating temperatures. Notably, control housing 60 may be positioned below a top 124 of cooking utensil 14 and may extend from second end 104 of flexible arm 58 down and away from cooking utensil 14. More specifically, control housing 60 may define a longitudinal axis A that forms an extension angle 126 relative to a vertical direction V when flexible arm 58 is attached to cooking utensil 14 (see, e.g., FIG. 3). According to an exemplary embodiment, extension angle 126 may be between 0 and 90 degrees, but is preferably greater than 45 degrees. According to another example embodiment, extension angle 126 may be approximately 70 degrees.

As a result, control housing 60 extends from cooking utensil 14 to place distance between itself and the heat sources—i.e., heating element 22 and cooking utensil 14. Angling control housing 60 in this manner allows second magnet 106 to hold control housing 60 directly on exterior surface 94 of cooking utensil 14 while allowing battery 72 (and other electronic components) to be set at a larger distance from cooking utensil 14 and heating element 22. This space 128 allows cooling air to circulate and creates boundary layer air flow between control housing 60 and the cooking utensil 14 while reducing the amount of heat energy exposed to control housing 60.

Control housing 60 of temperature probe 18 may further include a radiant heat shield 130 to block some of the radiant heat emitted from cooking utensil 14 and heating element 22 during the cooking process. According to the illustrated embodiment, radiant heat shield 130 is a thin aluminum steel alloy plate. However, other radiant heat shields are possible and within the scope of the present invention. For example, any suitable reflective barrier may be used to reflect or redirect radiant heat away from control housing 60.

Figure 5:
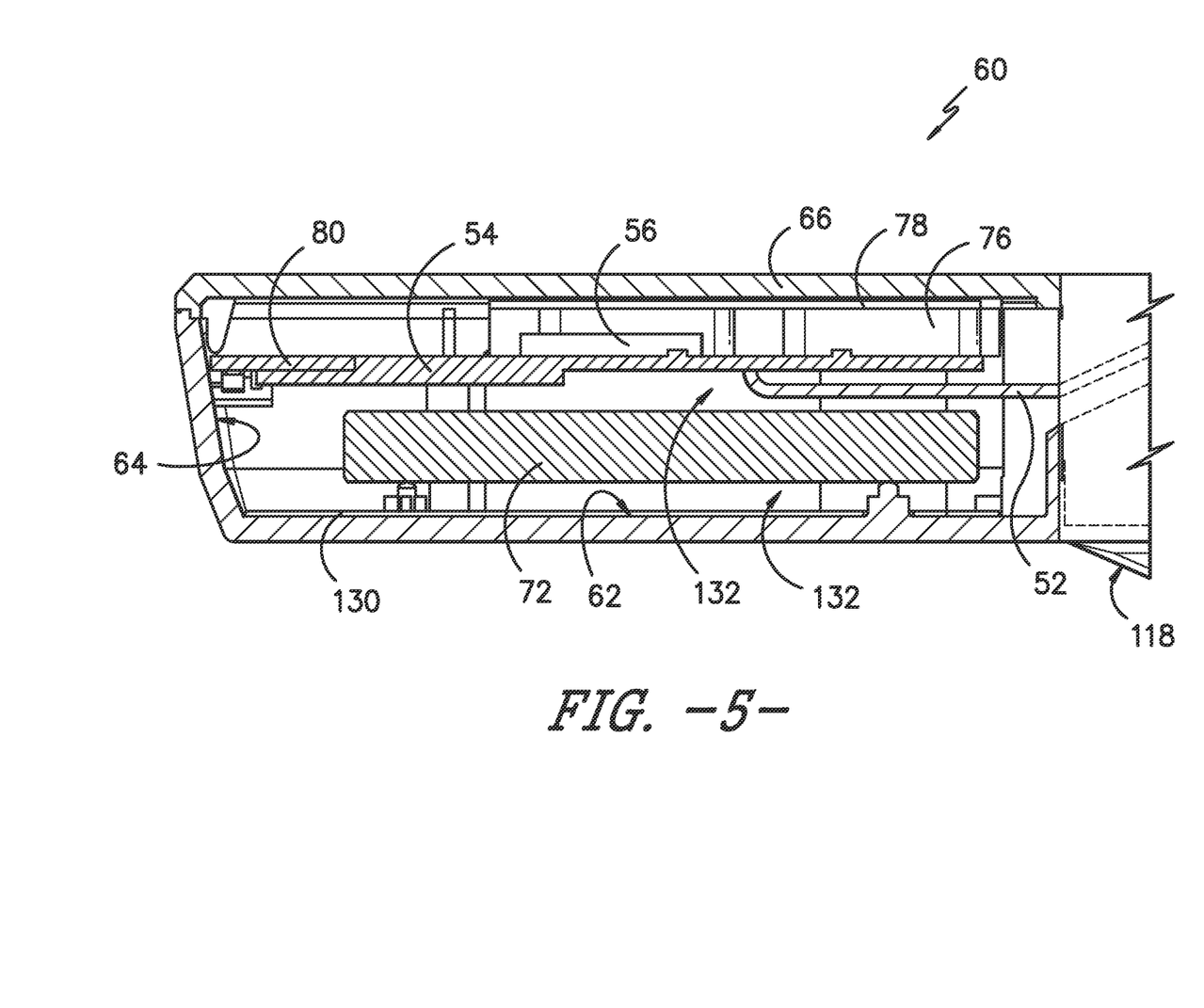
FIG. 5 is a side cross sectional view of the exemplary temperature probe of FIG. 1.

The size, position, and thickness of radiant heat shield 130 may be configured as needed for a particular application, but as shown in FIG. 5, radiant heat shield 130 is a rectangular aluminum steel alloy plate that is approximately 3 millimeters thick and covers a bottom surface 62 of control housing 60. In this manner, radiant heat shield 130 is positioned at least partly between cooking utensil 14 and the control electronics when temperature probe 18 is mounted on cooking utensil 14. So configured, radiant heat shield 130 is also positioned between heating element 22 of cooktop 12 and the control electronics. According to an alternative embodiment, radiant heat shield 130 may extend up around side surfaces 64 or may enclose the control circuitry of control housing 60 to more fully protect it from exposure to radiant heat energy.

As shown in FIG. 5, radiant heat shield 130 is placed adjacent bottom surface 62 of control housing 60. According to an alternative embodiment shown in FIG. 7, radiant heat shield 130 is spaced slightly above bottom surface 62 of control housing 60. In this manner, a circulation space 132 is provided between bottom surface 62 of control housing 60 and radiant heat shield 130 through which air may circulate to decrease the overall temperature in control housing 60. Similarly, control board 54 may be secured within control housing 60 by several mounting bosses 134 that create more circulation space 132 between radiant heat shield 130 and control board 54. As a result, control board 54 is spaced further away from the primary heat sources and additional room is provided for cooling air to circulate. By providing circulation space 132 of various sizes between the components enclosed in control housing 60, circulation of cooler air may ensure higher temperature "hotspot" regions may be reduced and temperature within control housing 60 may be lower and more uniform.

Figure 6:
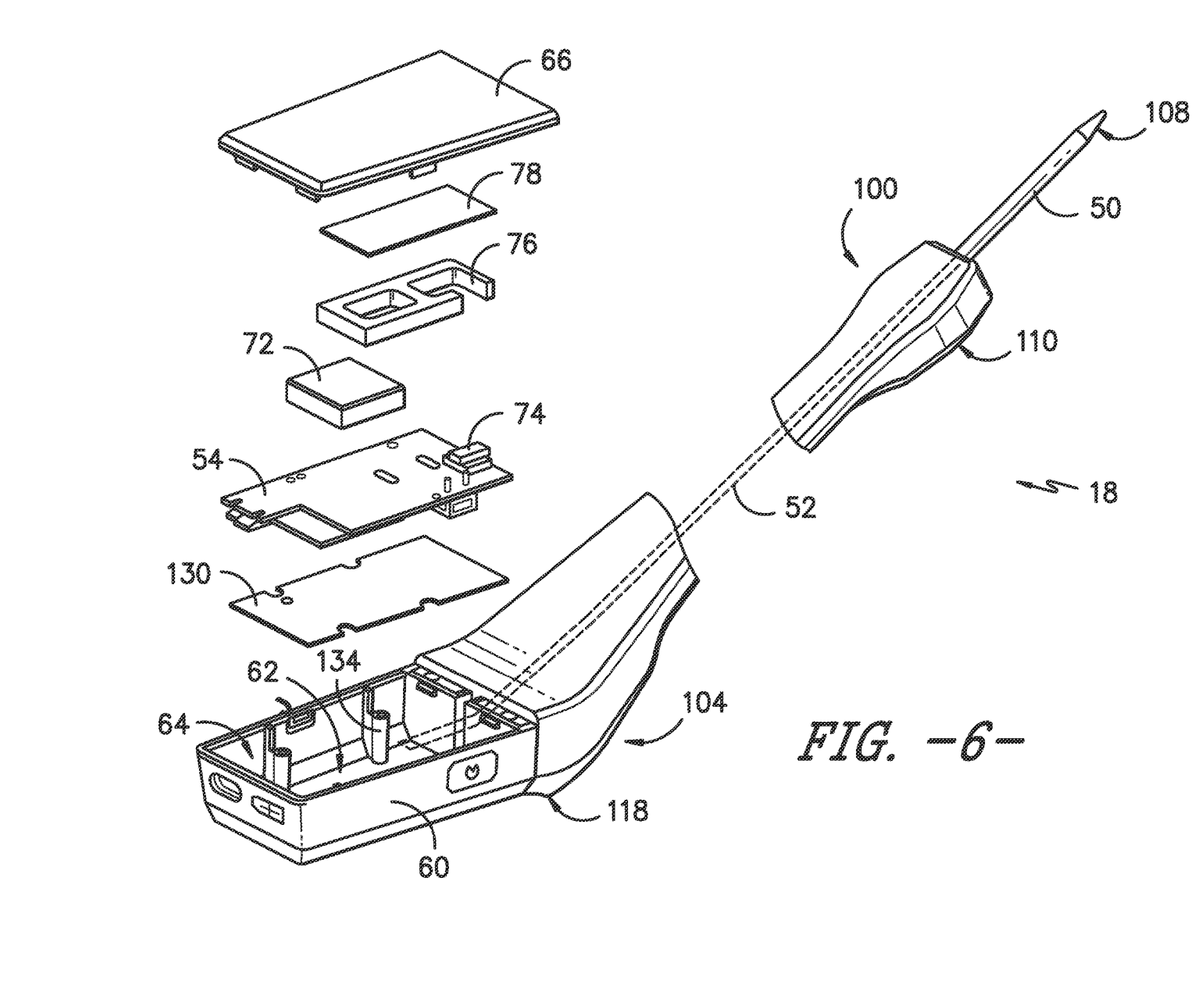
FIG. 6 is an exploded perspective view of an exemplary temperature probe according to another exemplary embodiment of the present subject matter.
Figure 7:
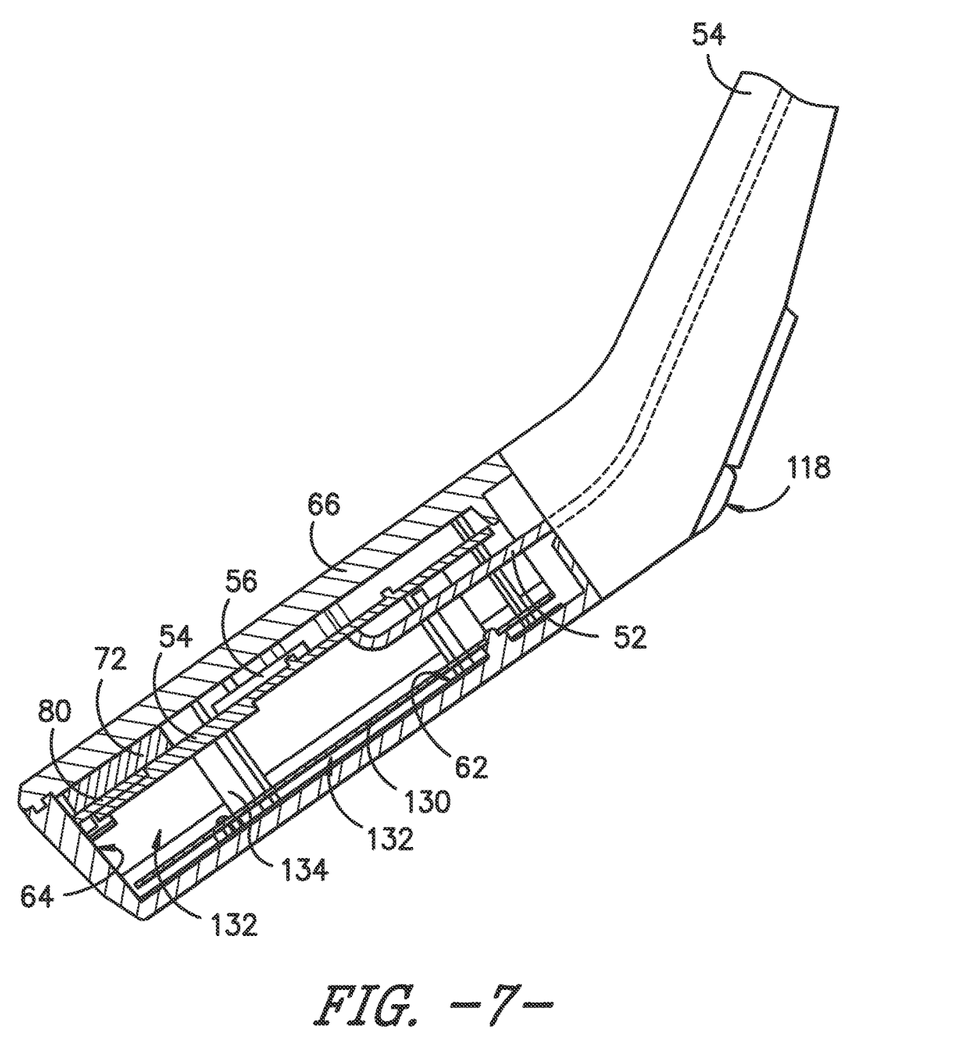
FIG. 7 is a side cross sectional view of the exemplary temperature probe of FIG. 6.
Figure 8:
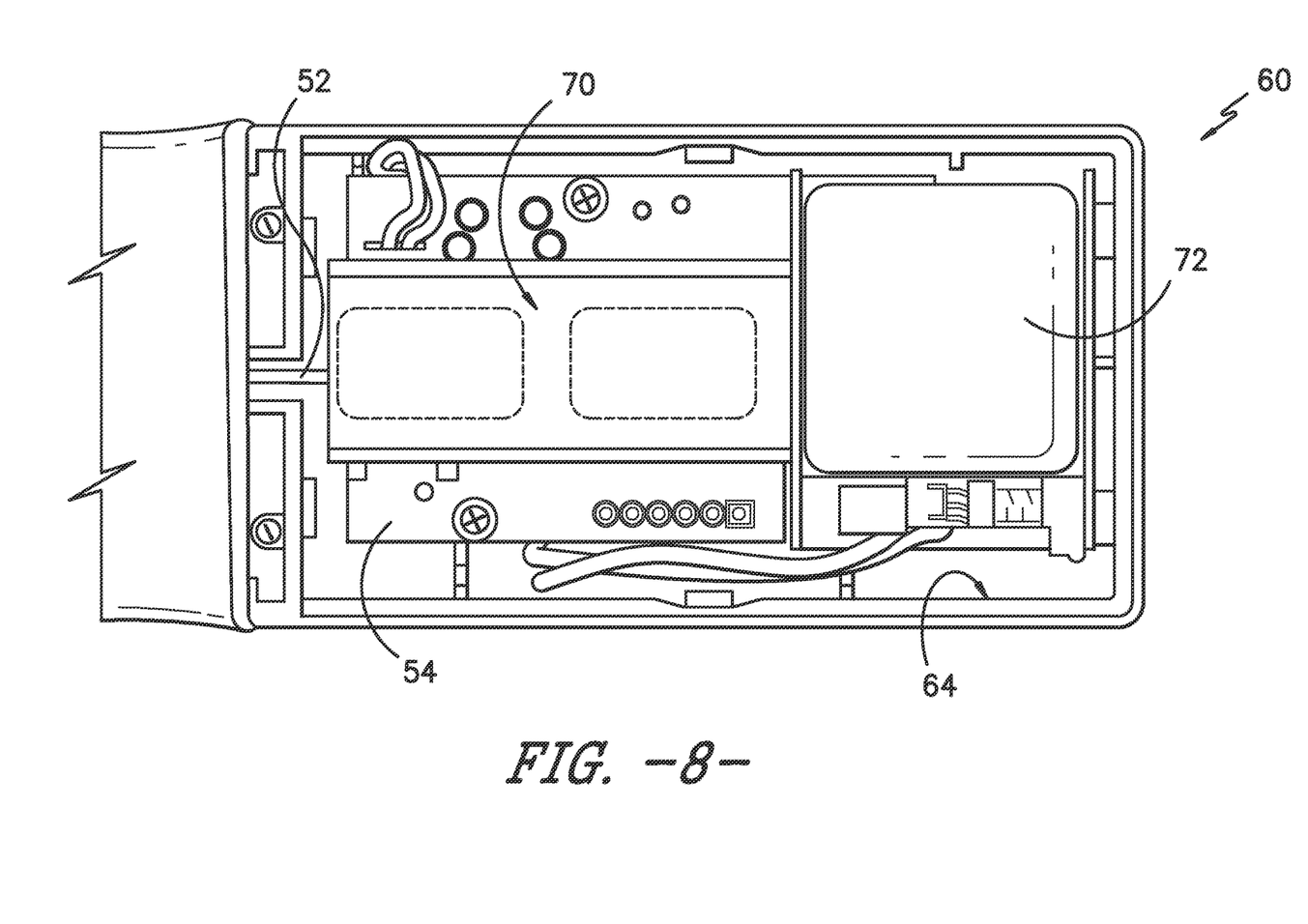
FIG. 8 is a top view of a control housing of the exemplary temperature probe of FIG. 6, with the cover removed for clarity.

As illustrated in FIGS. 6 through 8, control board 54 may be positioned between battery 72 and bottom surface 62 of control housing 60. More specifically, control board 54 may be a thin, rectangular printed circuit board that extends substantially throughout the rectangular cross section of control housing 60. Battery 72 may be disposed above control board 54—i.e., between control board 54 and cover 66—so that at least a portion of control board 54 is positioned between battery 72 and the primary heat sources—i.e., heating element 22 and cooking utensil 14—when control housing 60 is attached to cooking utensil 14. In addition, battery 72 is disposed at a portion of control housing 60 farthest away from cooking utensil 14. In this manner, control board 54 acts as an additional insulating layer and battery 72 is placed further away from the heat generating sources. By placing control board 54, radiant heat shield 130, or both between cooking utensil 14 and battery 72, and by positioning battery 72 as far from cooking utensil 14 as possible, battery 72 may experience reduced operating temperatures.

The above-described temperature probe 18 is capable of operating under increased operating temperatures. For example, when cooking appliance 10 is used for deep frying with oil, the oil must often be maintained at 375° F., but the temperature limit of the Lithium Ion Polymer battery 72 is around 140° F. Because temperature probe 18 is mounted directly to cooking utensil 14, prior probe configurations would cause battery 72 to exceed its maximum operating temperature. However, aspects of the present design significantly reduce the heat energy experienced by battery 72. For example, radiant heat shield 130 significantly dropped the radiant heat energy transferred to battery 72 from cooking utensil 14 and heating element 22 of cooktop 12. In addition, by moving battery 72 to the top side of control board 54, battery 72 temperature may be reduced by 30° F. or more. Therefore, aspects of the present invention allow more accurate cooking at higher temperatures with a prolonged life of both battery 72 and the entire temperature probe 18. Aspects of temperature probe 18 allow battery 72 to operate below its rated temperature while placing control housing 60 directly on cooking utensil 14. Temperature probe 18 therefore has improved reliability because battery 72 is kept safe and cool.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A temperature probe for measuring the temperature of food products within a cooking utensil, the temperature probe comprising:
    a flexible arm having a first end comprising a first magnet and a second end comprising a second magnet, the flexible arm being removably attachable to the cooking utensil by positioning the first end within the interior of the cooking utensil such that it is secured by magnetic force and positioning the second end proximate an exterior side of the cooking utensil such that it is secured by magnetic force;
    a temperature sensor extending from the first end of the flexible arm and being configured for measuring the temperature of the food products in the cooking utensil; and
    a control housing extending from the second end of the flexible arm downward and away from the exterior side of the cooking utensil while the second end of the flexible arm is magnetically secured to the exterior side of the cooking utensil, the control housing comprising a controller operatively connected with the temperature sensor,
    wherein the second end of the flexible arm defines a support surface configured for contacting the exterior side of the cooking utensil and extending the control housing away from the cooking utensil.

2. The temperature probe of claim 1, wherein the control housing further comprises a battery, a display, and a radiant heat shield, the radiant heat shield being positioned within the control housing between the battery and the cooking utensil.

3. The temperature probe of claim 2, wherein the radiant heat shield is an aluminum steel alloy plate.

4. The temperature probe of claim 1, wherein the battery is a rechargeable lithium-ion battery.

5. The temperature probe of claim 1, wherein the control housing is positioned below a top of the cooking utensil.

6. The temperature probe of claim 1, wherein the control housing extends from the second end of the flexible arm such that a longitudinal axis of the control housing forms an extension angle relative to a vertical direction when the flexible arm is attached to the cooking utensil, the extension angle being greater than 45 degrees.

7. The temperature probe of claim 6, wherein the extension angle is approximately 70 degrees.

8. The temperature probe of claim 1, wherein the support surface comprises support feet that space the control housing from the exterior side of the cooking utensil.

9. A temperature probe for measuring the temperature of food products within a cooking utensil, the temperature probe comprising:
    a thermistor configured for placement within the interior of the cooking utensil in thermal communication with the food products; and
    a controller body defining a mounting base and a control housing, the mounting base comprising a mounting magnet and defining a support surface, the mounting magnet being magnetically attachable to an outer wall of the cooking utensil such that the support surface sits flush against the outer wall and the control housing extends downward and away from a vertical direction and the outer wall of the cooking utensil, wherein the control housing comprises a battery, a display, and a control board in operative communication with the thermistor.

10. The temperature probe of claim 9, wherein a radiant heat shield is positioned within the control housing between the battery and the cooking utensil.

11. The temperature probe of claim 10, wherein the radiant heat shield is an aluminum steel alloy plate.

12. The temperature probe of claim 9, further comprising a flexible arm having a first end having the thermistor extending therefrom and a second end attached to the controller body, the first end comprising a sensor magnet and being magnetically attachable to an interior side of the cooking utensil such that the thermistor may be selectively positioned within the food products.

13. The temperature probe of claim 9, wherein the controller body is positioned below a top of the cooking utensil.

14. The temperature probe of claim 9, wherein the controller body defines a longitudinal axis forming an extension angle relative to the vertical direction when the controller body is attached to the cooking utensil, the extension angle being greater than 45 degrees.

15. The temperature probe of claim 14, wherein the extension angle is approximately 70 degrees.

* * * * *